United States Patent
Deschamps et al.

(10) Patent No.: US 6,496,188 B1
(45) Date of Patent: Dec. 17, 2002

(54) IMAGE PROCESSING METHOD, SYSTEM AND APPARATUS FOR PROCESSING AN IMAGE REPRESENTING TUBULAR STRUCTURE AND FOR CONSTRUCTING A PATH RELATED TO SAID STRUCTURE

(75) Inventors: Thomas Deschamps, Boulogne (FR); Shérif Makram-Ebeid, Dampierre (FR); Laurent Cohen, Neuilly-sur-Seine (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/477,221

(22) Filed: Jan. 4, 2000

(30) Foreign Application Priority Data

Jan. 4, 1999 (EP) .............................. 99400003
Mar. 26, 1999 (EP) ......................... 99400748.2

(51) Int. Cl.[7] .............................................. G06T 17/00
(52) U.S. Cl. ...................................................... 345/419
(58) Field of Search .............................. 345/418, 419, 345/420, 423, 424, 427

(56) References Cited

FOREIGN PATENT DOCUMENTS

WO    WO9613207    5/1996
WO    WO9811524    3/1998

OTHER PUBLICATIONS

"Levels–sets Method: Evolving Interfaces in Geometry, Fluid Mechanics, Computer Vision and Material Sciences" by Sethian, Cambridge University Press, 1996b, Chapter 9, pp. 87–95.

"Automatied flight path planning for virtual endoscopy" by Davis S. Paik et al., in Medical Physics, vol. 25(5) May, 1998, pp. 629–637.

"Global Minimum for Active Contour Models: A Minimal Path Approach" by Laurent D. Cohen et al., in International Journal of Computer Vision vol. 24(1) pp. 57–78 (1997).

Primary Examiner—Cliff N. Vo
(74) Attorney, Agent, or Firm—John Vodopia

(57) ABSTRACT

The invention relates to an image processing method for processing an image representing a tubular structure having walls, comprising steps for determining a flight path (EP) inside this tubular structure between a first and a second predetermined end points, said flight path being both the shortest path between said end points and the farthest from the structure walls (NB1). Said steps may comprise locating the structure wall points, determining a surface at a predetermined constant distance from said wall points, inside the structure, for forming a central region (CR), and determining, in said central region, the shortest path (EP) between the first and second end points.

18 Claims, 3 Drawing Sheets

IMAGE PROCESSING METHOD, SYSTEM AND APPARATUS FOR PROCESSING AN IMAGE REPRESENTING TUBULAR STRUCTURE AND FOR CONSTRUCTING A PATH RELATED TO SAID STRUCTURE

BACKGROUND OF THE INVENTION

The invention relates to an image processing method for processing an image representing a tubular structure and for constructing a path related to said structure. The invention also relates to an image processing system to perform said method. The invention further relates to medical CT or MR apparatus having processing means for constructing 3D-images and processing means for performing virtual endoscopy based on said method.

The invention finds its application in the industry of medical apparatus.

An image processing method for computation of a flight path in medical images for virtual endoscopy is already known from the publication "Automated Flight Path Planning for Virtual Endoscopy" by David S. PAIK, Christopher F. BEAULIEU et alii, in Med. Phys. 25 (5), May 1998, pp.629–637. This publication discloses an automatic computation of a flight path for guiding virtual endoscopic exploration of three-dimensional medical images. This flight path finding method, for positioning a virtual camera flying through images, includes a medial axis transform which provides a first path and an iterative correction of said first path toward the medial axis. More specifically, this method comprises steps of: segmentation of the volume by an operation of region growing and "bubble" removal; computation of a first path by connecting a starting voxel to an end voxel; iterative bringing towards the 3-D medial axis, referred to as improvement of the first path; smoothing the path to determine positions along the medial axis to form said flight path; determination of the virtual camera orientation (direction and twist) along the flight path.

This method first defines a structure of interest by a region growing algorithm which segments the 3-D image starting from seed voxels and which grows regions of interest by connecting to each seed voxel 26 voxels meeting a threshold criterion and by removing inhomogeneities called bubbles; then this method computes an Euclidean distance map in a region of interest and a first Euclidean path that is the shallowest descent in this map; this first Euclidean path is further centralized by an iterative step which removes all surface voxels from the region of interest, determining a new distance map and a new path through this new distance map until the region of interest is thinned away and only the centralized path remains.

This known method provides means for constructing a flight path which is centered at best in said tubular structure. For the application to virtual endoscopy, a centered path is not actually most appropriate to fly the virtual camera through the tubular object because the anatomical tubular object is generally very contorted so that a centered path would be unnecessarily very long and complicated. Besides, certain location found on said centered path would not even be correct to position the virtual camera because for instance said location may be situated just in front of an important protuberance obstructing the view. Moreover, using the computing means known at the present time, the known method needs several minutes to be performed because it necessitates the computation of several distance maps in the iterative step which is proportionally time consuming.

The visualization of volumetric medical image data plays a crucial part in diagnosis operation and therapy planning. The better anatomy and pathology are understood, the more efficient operations can be performed at low risk. Basically, virtual endoscopy gives views of regions of the body dangerous or impossible to reach physically with a camera, such as brain vessels for example, the only requirement being to inject a contrast product in the anatomical objects for better detection. Virtual endoscopy supplies perspective views of human anatomy simulated from the inside of tubular structures. This allows the user to view complex anatomical structures in a comfortable way after data acquisition and almost instantly. A virtual endoscopic system may comport two parts:

Means for an endoscopic path construction providing a continuous location of a flight through the tubular structure of interest;

Three-dimensional interior viewing along the endoscopic path; those views are adjoined creating an animation which simulates a virtual flight through them; the views may be created using 3-D rendering or ray tracing known techniques.

It is an object of the invention to provide a method for acquiring data of a 3-D image representing a contorted tubular structure and for constructing automatically the most appropriate path to fly inside said structure for application to virtual endoscopy in 3-D medical images. It is an other object of the invention to provide said method to be carried out in less time than the known method when using the same kind of computing means.

According to the invention, these objects are achieved by a method in which a first end point and a second end point for a flight path inside the tubular structure are determined and the flight path is determined which is the shortest path between the first and second end points at a maximum, constant distance from the walls of the tubular structure irrespective of the shape of the tubular structure.

An advantage of the method of the invention is that the constructed path in a contorted tubular object shows two important properties. First, this path is maintained at a predetermined distance from the internal walls of the contorted tubular object which may be different from the distance of the exact center line but is more appropriate for obtaining a good visualization of the interior of the object, thereby ensuring that the visualization is not obstructed by a nearby protuberance. Second, this path is also the smallest possible path remaining at the predetermined distance from the internal walls. Another advantage is that this method is completely automated, apart from the need to set only two end conditions, and that only a small part of the 3-D image is visited for finding the path. Another advantage is that only one first computation of a distance map is needed, the first distance map providing the data necessary to perform the further steps of the method. So, the method is not time consuming: only 10 to 30 seconds are necessary to carry out the steps of providing the path with the same kind of computing means as the method of the cited prior art. Another advantage of this method is that it further permits building of a 3-D interior view of the structure along this path without user interactivity other than setting the two end conditions. It also permits visualizing of the inside of the structure without colliding with the internal walls, without crossing the walls and without being obstructed by parts of the contorted tubular object. In particular, this method permits visualizing of the inside of anatomical objects in 3-D CT or MR images in a virtual way and in an automated manner. Thus, this method may be applied to virtual endoscopy.

OBJECTS AND SUMMARY OF THE INVENTION

It is also an object of the invention to provide a system for carrying out this method and to provide a medical apparatus having means for acquiring 3-D images and having a system to process the images according to this method for virtual endoscopy.

This problem is solved respectively by a system as claimed in claim 9, and by an apparatus as claimed in claim 10.

BRIEF DESCRIPTION OF THE DRAWINGS

The invention is described hereafter in detail in reference to diagrammatic figures, wherein.

Figure 1A:
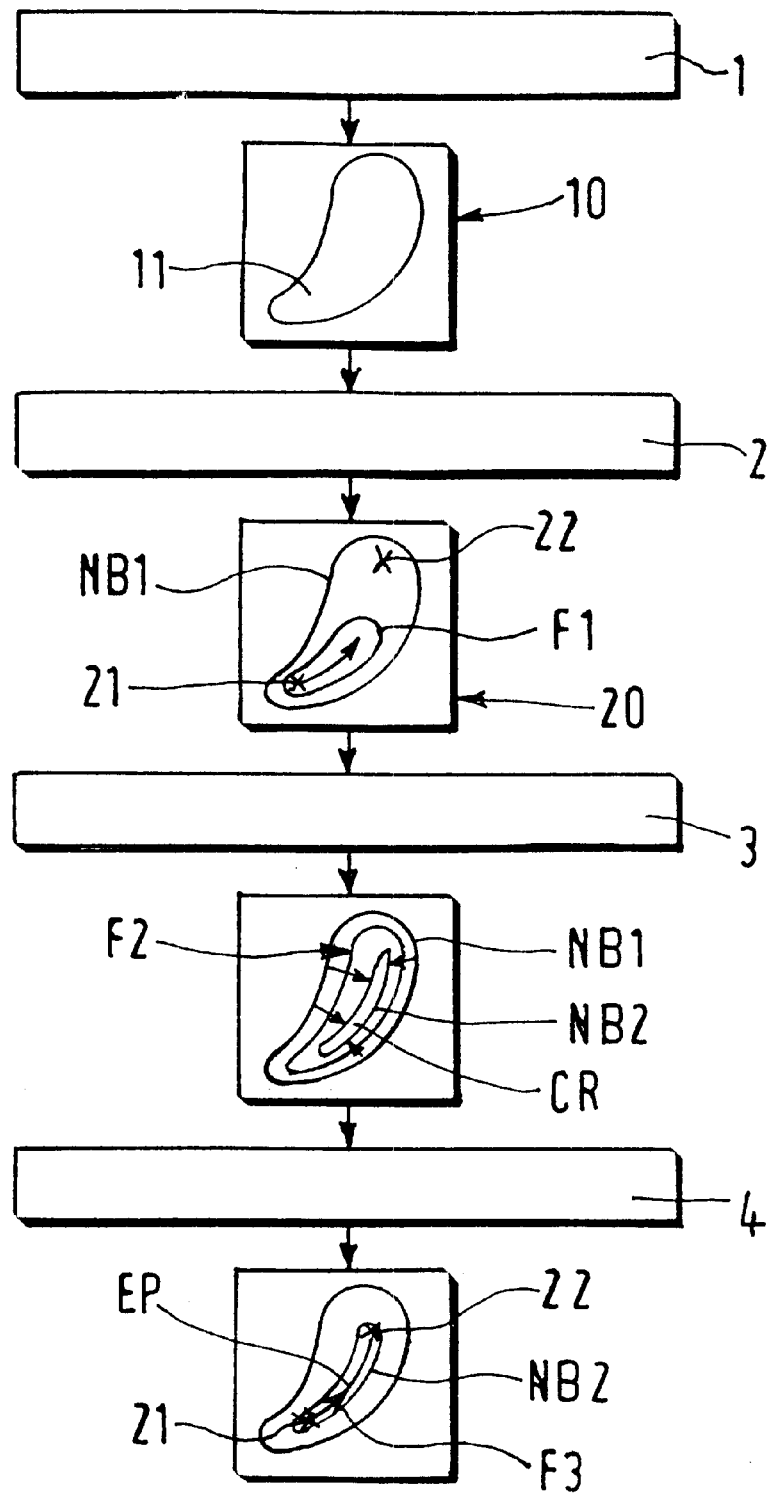
FIG. 1A and 1B are functional block diagrams of the method steps.

The invention relates to an image processing method for processing a multidimensional image, for instance a three-dimensional image referred to as 3-D original image, representing a tubular contorted object on a non-uniform background. This method comprises steps for performing an automatic construction of a best possible flight path, originating from a given starting point and extending inside said tubular contorted object until an ending condition is met. In the following description, as an example, this method is applied to virtual endoscopy and in particular to virtual colonoscopy which is a medical procedure allowing medical practitioners to use CT or MR volumetric images in order to visualize the inside of the colon without using a physical endoscope threaded inside a patient's colon, that is to say without invading means. According to the present invention, the practitioner is allowed to quickly find the most appropriate path to virtually navigate inside the topologically complex colon represented in the 3-D image. The image processing method of the invention comprises steps for building such an appropriate flight path with a minimum of user interactivity. This image processing method constitutes an automatic path finding technique which may further be applied in various fields of medical imaging.

DESCRIPTION OF THE PREFERRED EMBODIMENTS

A method to determine a minimal contour, referred to as minimal path, of an object between two end points in a 2-D image, is disclosed in the publication "Global Minimum for Active Contour Models: A minimal Path Approach" by Laurent D. COHEN and Ron KIMMEL, in International Journal of Computer Vision 24(1), 57–78 (1997). This method comprises steps of manually selecting a start point and an end point in a contour region of a gradient image; of propagating a front in said whole gradient image starting at the start point, in such a manner that this front propagates at a lower cost in regions of high gradient values thus principally in said contour region, until the end point is reached; and steps of back-propagating from the end point towards the start point by a simple steepest gradient descent which provides a minimal path between the start and the end point, thereby providing a binary contour of a given object in the 2-D image. Said minimal path is a path of minimal cost between two points i.e. a path along which the integration over a potential that takes lower values near contours is minimal. This publication refers to an algorithm for propagating a front in a potential 2-D grid of points using a "Fast Marching" technique with a determination of the front points using a "Min Heap" technique disclosed in a book by SETHIAN, 1996b, "Level-sets Method: Evolving Interfaces in Geometry, Fluid Mechanics, Computer Vision and Material Sciences" Cambridge University Press. The front is a solution of a so-called Eikonal Equation which is written:

$$|\nabla T|F=1$$

where F is the speed of the moving front and T is the crossing time. The "Fast Marching" algorithm takes into account that information propagates from smaller values of time T to larger values. The algorithm is made fast by considering a set of points in a "Narrow Band" around the existing front, and to march this narrow band forwards, freezing the values of existing points and bringing new ones into the narrow band structure. The selection of the grid points to update the "Narrow Band" is made by locating the grid points in a "Min-Heap" structure which is a complete binary tree with a property that the value at any given node is less than or equal to the values at its children. The efficiency of the algorithm depends on the time for locating the points inside the "Narrow Band" with minimal arrival time.

According to the present invention, an automatic path tracking technique is provided in a 3-D image by mapping a path tracking operation into a shortest path tracking operation performed between two fixed end points. Defining a cost function inside an image, the shortest path is the path whose integral of the cost between the two end points is minimal. Now, the operation of finding the minimal path is mapped into an operation of finding the solution of a front propagation equation, with a given initial front. Said equation is derived from the Eikonal Equation. The resulting path being the shortest, the cost function must be an appropriate minimal measure. However, according to the invention, supplementary conditions are set in order that the proposed cost function may be appropriate to provide an endoscopic path to flight through the contorted tubular structure:

The path according to the invention is neither the best centered path (center line) nor is it the shortest path (back-propagation in the gradient image).

The path according to the invention is the shortest among the paths which are the farthest from the walls.

To that end, the path is positioned in a region whose edges are at an equal distance from the walls. This path is therefore appropriate to "fly" through the contorted tubular structure with the best view of the structure interior.

Thus, the invention comprises a first phase for building an image-based measure to define a specific minimal measure in the 3-D image and for introducing it in the Eikonal Equation. According to this measure, a front is propagated on an image domain, starting from an initial front restricted to one of the fixed point. The arrival times at each point of the domain are computed with the Eikonal Equation and give the cost to go from said points to the starting point. The propagation operation is stopped once the second fixed point is reached by the front. The computed costs form a cost map which is convex and has only one global minimum. The "Fast Marching" technique is adapted to the grid points of the 3-D image. For that purpose, the voxels which are close to a current front during its propagation form a "Narrow Band" of voxels which are stored at each step of the front propagation in "Min Heap" structures so as to be efficiently located. An important property is that the front propagates faster in the low cost regions. According to the invention, the cost is designed to be lower inside the tubular structure and higher elsewhere, especially in the zones of boundaries. To that end, the measure is based on gray level information in order that the front propagates faster inside the uniform gray level regions and practically stops at the object boundary. This enables to get correctly the tubular object boundaries.

The shortest path between end and first points could be obtained by using a back-propagation descent along the steepest gradient values from the end point to the start point, but, as discussed above, this shortest path is not adequate to solve the problem of the invention because it may be too close to the tubular object walls around each path turn whereas the desired endoscopic path should be positioned as described above.

For that purpose, the invention comprises a second phase for providing a second cost measure which is high near the edges and low in the center of the object, by computing a distance map of the opposite distance to the tubular object walls. The expected best path should be as far as possible from the object edges, taking into account that the radius of the object may vary substantially in certain regions along the path i.e. the distance from the walls is not constant along the center line of the object; it is the reason why the distance map is threshold to prevent the endoscopic path to show sudden turnings when the tubular object has a sharp bent. So, the endoscopic path is not absolutely centered but situated in a region whose edges are at equal distance from the walls.

In order to obtain eventually the appropriate endoscopic path, the method according to the invention performs these two phases in five main steps including three different front propagations. Referring to FIG. 1A, these main steps are:

1) Acquisition 1 of 3-D image data 10 representing the tubular object 11;
2) Propagation 2 of a first front F1 in the 3-D image from a first initial front which is a starting point 21 until an end point 22 is reached, for computing final Narrow Band points NB1 of a final front labeled edge points of the tubular object;
3) Propagation 3 of a second front F2 from a second initial front NB1 formed of said edge points towards the object center for computing a distance map of second front points with respect to said object boundary NB1 and providing a second final front NB2; Thresholding this distance map and inverting said threshold distance map in order to provide a measure of distance from the object center;
4) Using said measure of distance for propagating 4 a third front F3 from the starting point 21 until the end point 22 is reached, thus providing the endoscopic path EP which is positioned in the central region CR defined by the second final front NB2.

Figure 1B:
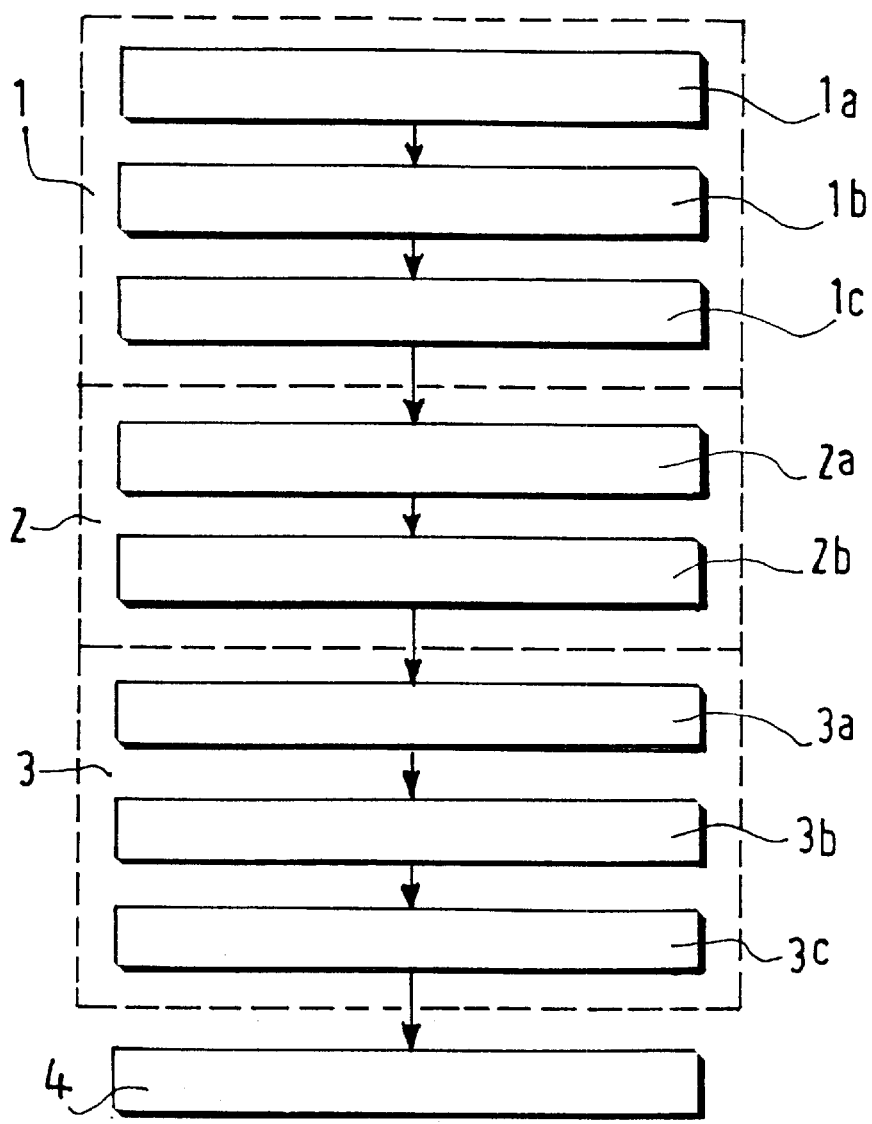
Figure 3:
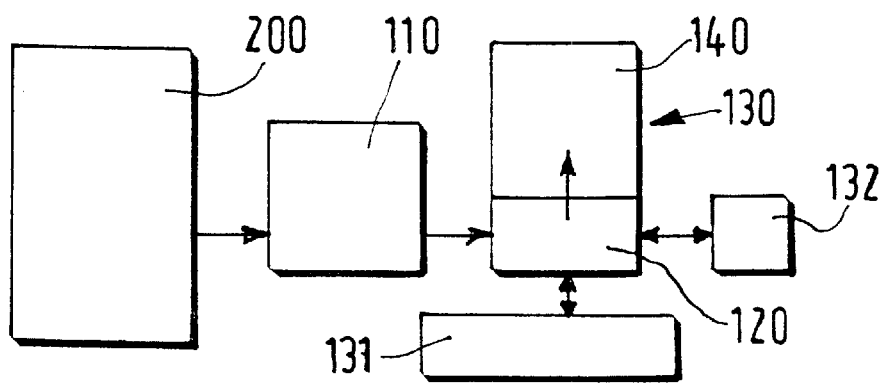
FIG. 3 illustrates a medical apparatus with means for performing the method.

Referring to FIG. 1B and FIG. 3, the present image processing method is applied as an example to medical images of a patient's colon and comprises:

1) step 1, including sub-steps of:
   a) Data acquisition 1a of a 3-D original image 10 representing a tubular contorted object 11 on a non-uniform background BG and displaying said image for instance on a screen 140 of a workstation 130 having calculation means 120 to process these image data. In said example; the tubular object is the colon. This original medical image may be acquired by any technique such as by example CT or MR technique. The invention does not depend on the way the 3-D original image is acquired.
   b) Enhancement 1b of the image gray levels. In the 3-D original image 10, the colon 11 has lower and more uniform gray level values than the background. In a preferred embodiment, the voxel gray levels referred to as voxel values are enhanced in order to set them to still lower and more uniform values inside the desired anatomical object. To this end, the gray level of each voxel may be replaced by a non-linear function of said gray level such as the square value of the gray level or the difference between the original gray level of said voxel and the mean gray level of the tubular structure. By this operation, the contrast between the gray level in the internal part of the tubular structure with respect to the gray level of its edges is enhanced in an image 20.
   c) Setting 1c a starting point 21 in the colon region and determining an ending condition 22. For example, the starting point 21 may be selected using the mouse 132 or the keyboard 131 of the workstation 130. The ending condition may be entered through the workstation means as one of many: either a destination point 22 or the extremity of an Euclidean path length originating at the starting point 21.

Figure 2A:
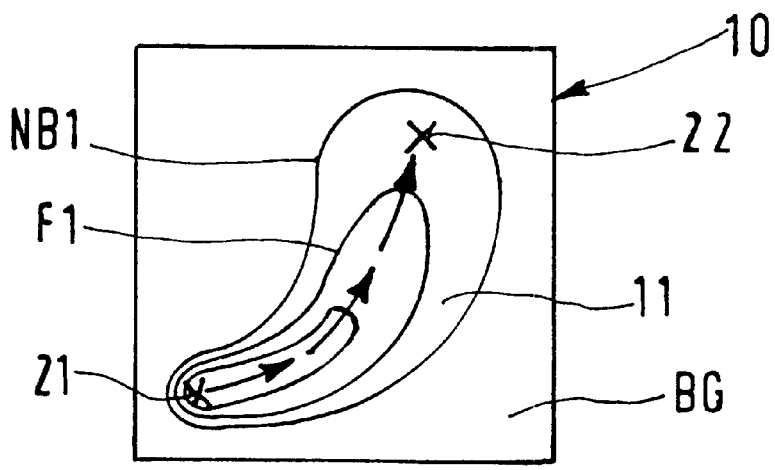
FIG. 2A to 2C illustrate the tubular object in the steps of the method.

2) Step 2, illustrated by FIG. 2A, including the following sub-steps:
   a) Propagation 2a of a first front F1 based on the voxel gray level data in this 3-D image 20, starting at the starting point 21 and propagating the front F1 until the ending condition 22 is reached: either the front F1 has reached the predetermined destination point referred to as end point or the front has reached the extremity of the given Euclidean path length. In the case when the Euclidean path length is used as ending condition, the last point visited by the front is considered the actual end point. At each visited point of the front F1, a cumulated cost for reaching this point is calculated. A non-Euclidean path-length is evaluated for joining this point to the starting point. All the cumulated costs calculated during this sub-step constitute a cost map. The front is an evolving interface which grows like a balloon inflating inside the 3-D image preferably in the substantially uniform and of low gray level regions of the colon. The front is a surface of minimal action which is solution of the Eikonal Equation such as at each current point of the image, the value of this surface corresponds to the minimal energy integrated along a path that starts at the starting point and ends at said current point. A marching operation derived of the known "Fast Marching" operation is used to propagate this surface based on the fact that the gray level information is propagated from the starting point onwards and on the fact that the solution of the Eikonal equation at a given point depends only on those neighboring points which have lower gray level values, thus providing a method of marching in an ordered way. The lowest is the gray level of the current voxel, the lowest is the cost to go from the starting point to said current voxel. This sub-step is initialized at the starting point and is propagated to the eight nearest neighbors. At each of these neighbors, the cost is calculated according to the Eikonal Equation in such a manner that:

$$\nabla U1 = P1$$

where U1 is the calculated distance and P1 is either the pixel value or preferably the non-linear function of the gray level. The Eikonal Equation calculated at each visited current point gives cost values which constitute the first cost map forming a first distance map. From each of said eight first neighbors, the front F1 is propagated to eight new neighbors exclusive of the voxels which have already been visited and so on until the ending condition is reached. The neighbors which have the lowest gray level are such that the cost for visiting said voxels is smaller. Thus, the front F1 propagates faster in the voxels having the lowest gray levels and the front propagation is stopped as soon as the ending condition 22 is reached. An advantage of this propagating operation based on gray level information is that at the moment when the ending condition 22 is reached the front has propagated only in the colon regions 11 which have uniform low gray level values i.e. only the internal voxels of the colon may be visited instead of all the 3-D image voxels, which represents a drastic computation time economy of the order of 90%. An other advantage is that at the moment when the ending condition is reached the final narrow band NB1 formed of the points of the terminal front sticks to the boundaries of the colon where the gray level values change rather abruptly and are high. So, the front F1 cannot cross the colon boundaries NB1. This is a great advantage because the colon is a rather contorted object in 3-D with boundaries very difficult to follow. According to the method of the invention the front cannot go out of the colon. In this sub-step, the image is segmented into a class of visited voxels i.e. the voxels of the colon 11 and not visited voxels i.e. those of the background BG.

b) Labeling 2b of the edge voxels. Among the visited voxels, the image is again segmented into a class of the internal voxels 11 of the colon and a class of the terminal front voxels labeled edge voxels NB1. This step is especially important because it permits of locating these edge points.

Figure 2B:
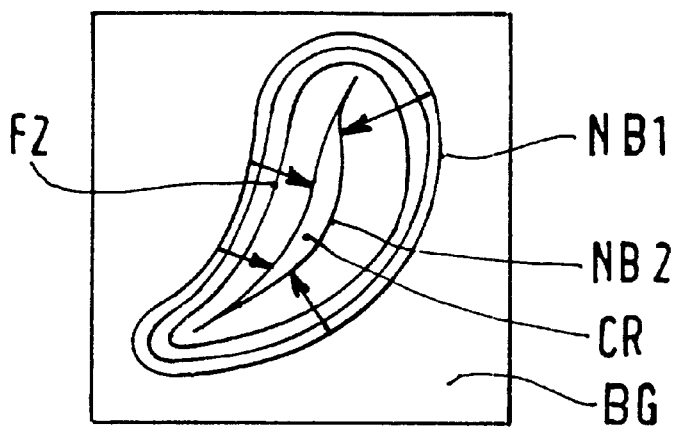

3) Step 3, illustrated by FIG. 2B, including the following sub-steps:

a) Propagation 3a of a second front F2 3a. Using a front propagation technique as described above, starting from a second initial front constituted of the points of the final narrow band NB1 of the previous step 2 forming the edge class, a second front F2 based on the distance between voxels instead of on gray level values is propagated inside the colon 11 towards the center of the colon according to the Eikonal Equation:

$$\nabla U2 = P2$$

where U2 is the distance of the current front F2 to the initial front NB1 situated at the edge of the colon and where P2 equals 1 everywhere. This sub-step uses no more gray level information; it is assumed that the gray level inside the tubular object is uniform. This second front propagation represents a deflation which provides a new cost map inside the object, indicating at each point the distance U2 to the walls, so providing a second distance map: at each step of this second propagation operation, the front F2 constitutes surfaces which are equidistant from the initial front NB1 i.e. the edge of the object. Said new cost-map is defined such that costs are the smallest the further away the current point is from the walls of the colon. This operation determines a central region CR of the colon limited by a terminal front NB2 of this deflation 3a constituting the edges of this central region CR which are equidistant from the edges NB1 of the tubular object 11.

b) Threshold 3b of the distance U2 between the initial front NB1 and the terminal front NB2 i.e. between the initial narrow band formed of the edge points of the object and the terminal narrow band formed of the edge points of the central region CR. This threshold distance may be evaluated in millimeters, such as 10 mm.

c) Inversion 3c of the distance U2 in the distance map to reduce the computation time.

Figure 2C:
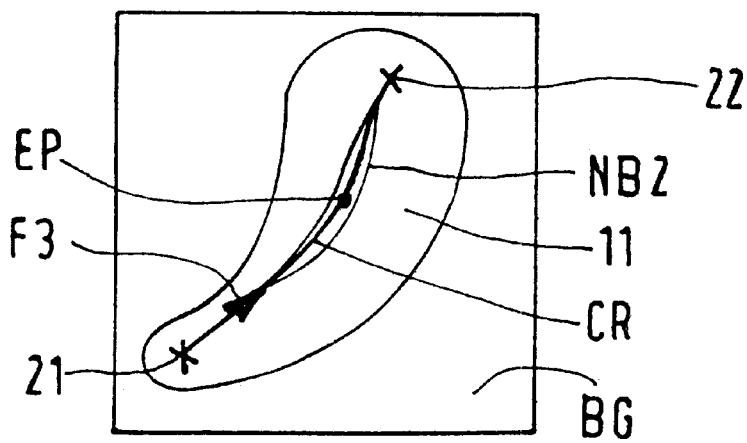

4) Step 4, illustrated by FIG. 2C, including propagation of a third front F3 according to the Eikonal Equation:

$$\nabla U3 = P3 \text{ with } P3 = 1/(1+U3)$$

where U3 is the propagation time of this third front F3. This third front F3 propagates from the starting point 21 to the end point 22 and in the central region CR determined in the previous step. According to this equation, the propagation time is very small in the center of the central region CR and is larger at the central region edges NB2. As a result, the best centered is the propagation path, the smallest is the cost, since the best centered is the propagation path, the smallest is the propagation time. The resulting path EP is now centered at best in the central region CR; it is the smallest path within said central region CR; it is the path farthest from the tubular object walls NB1 in the anatomical object 11; and it is taken as endoscopic path EP.

Referring to FIG. 3, image signals of image frames, provided for instance by an X-ray apparatus 200, may be further provided to a known system 110 of constructing 3-D images such as a 3-D rendering system. From this known system, the 3-D image data are provided to an image processing system 120 for processing the data according to the method of the invention. This image processing system 120 may be a suitably programmed computer of a workstation 130 having a screen 140, for a special purpose processor having circuit means, that are arranged to perform the functions of the method steps according to the invention. The workstation 130 may also comprise a keyboard 131 and a mouse 132. The image processing system 120 also comprises virtual camera means for simulating a virtual camera performing a virtual flight inside the tubular object, said virtual camera following the endoscopic path determined according to the method of the invention. The virtual camera means creates an animation which simulates the virtual flight through.

What is claimed is:

1. An image processing method for processing an image representing a tubular structure having walls, comprising the steps of:

determining a first end point and a second end point for a flight path inside the tubular structure; and determining the flight path inside the tubular structure between the first and second end points which is the shortest path between the first and second end points at a maximum constant distance from the walls of the tubular structure irrespective of the shape of the tubular structure.

2. A method as claimed in claim 1, wherein the step of determining the flight path comprises the steps of:

determining the location of the structure wall points, determining a surface at a predetermined constant distance from the wall points to thereby form a central region inside the structure, and determining the shortest path between the first and second end points in the central region whereby the shortest path thus-determined constitutes the flight path.

3. A method as claimed in claim 2, wherein the step of determining the location of the structure wall points comprises the steps of:
  imposing substantially low gray level values to internal voxels of the structure, and
  propagating a first front from a first initial front reduced to the first end point, based on gray level values, which determines a first terminal front formed of the structure wall points when the second end point is reached.

4. A method as claimed in claim 3, wherein the step of determining a surface at a predetermined distance from the wall points comprises the steps of:
  propagating a second front from a second initial front which is the first terminal front, based on distance values, towards the center of the structure, which determines a second terminal front whose voxels are equidistant to the second initial front, which also determines the central region inside the second terminal front.

5. A method as claimed in claim 4, wherein the step of determining the shortest path between the first and second end points in the central region comprises the step of:
  propagating a third front inside the central region from the first end point to the second end point, thus determining the shortest path which is the maximum distance from the structure walls.

6. A method as claimed in claim 5, wherein the step of propagating the third front is performed based on a distance map calculated from the propagation of the second front which is subjected to a threshold and then inverted.

7. A method as claimed in claim 5, further comprising the step of performing the propagation of the first and second fronts along surfaces of minimal energy integrated between the initial fronts and the terminal fronts according to the Eikonal Equation.

8. A method as claimed in claim 5, further comprising the steps of:
  basing the propagation of the first front on gray level values and voxel distances,
  basing the propagation of the second front on the distance from the current front to the second initial front in the propagation of the second front, and
  basing the propagation of the third front on the propagation time between the first and second end points in the central region.

9. A system comprising a programmed computer of a workstation or a special purpose processor having circuit means, which are arranged to perform the method as claimed in claim 1, and comprising:
  means to display images processed according to said method, and
  virtual camera means to perform virtual endoscopy along the flight path constructed using said method.

10. An imaging apparatus comprising:
  means to acquire 3-D medical images of tubular structures; and
  a system as claimed in claim 9 to perform virtual endoscopy in the tubular structures.

11. A method as claimed in claim 3, further comprising the step of performing the propagation of the first front along surfaces of minimal energy integrated between the first initial front and the first terminal front according to the Eikonal Equation.

12. A method as claimed in claim 11, further comprising the step of basing the propagation of the first front on gray level values and voxel distances.

13. A method as claimed in claim 4, further comprising the step of performing the propagation of the second front along surfaces of minimal energy integrated between the initial fronts and the terminal fronts according to the Eikonal Equation.

14. A method as claimed in claim 13, further comprising the step of:
  basing the propagation of the second front on the distance from the current front to the second initial front in the propagation of the second front.

15. A method as claimed in claim 4, further comprising the step of performing the propagation of the first and second fronts along surfaces of minimal energy integrated between the initial fronts and the terminal fronts according to the Eikonal Equation.

16. A method as claimed in claim 15, further comprising the steps of:
  basing the propagation of the first front on gray level values and voxel distances, and
  basing the propagation of the second front on the distance from the current front to the second initial front in the propagation of the second front.

17. A method as claimed in claim 1, wherein the step of determining the flight path comprises the step of first determining a surface at the maximum, constant distance from the walls of the structure and then determining the shortest path along the surface which will constitute the flight path.

18. A method as claimed in claim 17, wherein the step of determining the surface at the maximum, constant distance from the walls of the structure comprises the steps of determining edges of a central region which are equidistant from edges of the structure.

* * * * *